United States Patent
Dolan et al.

(10) Patent No.: US 8,974,850 B2
(45) Date of Patent: Mar. 10, 2015

(54) CONVOLUTED CHOCOLATE PRODUCT WITH REGIONS OF WEAKNESS AND PROCESS FOR PREPARATION THEREOF

(75) Inventors: Vincent Dolan, Louth (IE); Eoin Foster, Kerry (IE); Caroline Foster, legal representative, Rathmore (IE)

(73) Assignee: Cadbury UK Limited (GB)

( * ) Notice: Subject to any disclaimer, the term of this patent is extended or adjusted under 35 U.S.C. 154(b) by 239 days.

(21) Appl. No.: 13/320,913

(22) PCT Filed: May 18, 2010

(86) PCT No.: PCT/GB2010/000999
§ 371 (c)(1),
(2), (4) Date: Feb. 27, 2012

(87) PCT Pub. No.: WO2010/133835
PCT Pub. Date: Nov. 25, 2010

(65) Prior Publication Data
US 2012/0148724 A1    Jun. 14, 2012

(30) Foreign Application Priority Data

May 21, 2009    (GB) .................................. 0908781.8

(51) Int. Cl.
*A23G 1/00* (2006.01)
*A23P 1/10* (2006.01)
*A23G 1/50* (2006.01)
*A23G 1/54* (2006.01)
*A23G 1/20* (2006.01)

(52) U.S. Cl.
CPC ............ *A23G 1/0076* (2013.01); *A23G 1/0053* (2013.01); *A23G 1/205* (2013.01); *A23G 1/50* (2013.01); *A23G 1/54* (2013.01); *A23G 1/545* (2013.01)

USPC ........................... 426/631; 426/104; 99/450.1

(58) Field of Classification Search
None
See application file for complete search history.

(56) References Cited

U.S. PATENT DOCUMENTS

| | | | |
|---|---|---|---|
| 2,132,690 A * | 10/1938 | Hilliard | ......................... 426/144 |
| 3,345,041 A | 10/1967 | Van Der Schee | |
| 3,922,130 A | 11/1975 | Bensdorp | |
| 6,349,816 B1 | 2/2002 | Tenzer et al. | |
| D589,230 S * | 3/2009 | Samarut | ......................... D1/121 |

FOREIGN PATENT DOCUMENTS

| | | |
|---|---|---|
| DE | 2554172 A1 | 6/1977 |
| EP | 0321499 | 6/1989 |
| EP | 1378175 A1 | 1/2004 |

(Continued)

OTHER PUBLICATIONS

Hoffman, Mable. 1978. Chocolate Cookery. Dell Publishing Co., Inc. New York. p. 18, 19, 22, 23, 260-261.*

(Continued)

*Primary Examiner* — Carolyn Paden
(74) *Attorney, Agent, or Firm* — Cantor Colburn LLP

(57) ABSTRACT

A confectionery composition is described. The confectionery composition includes a convoluted chocolate sheet having fold lines arranged generally along a first direction and having at least one region of weakness. Each region of weakness extends along the full width of the chocolate sheet substantially in a single plane transverse to the first direction. Also described are scraper blades for removing chocolate from a roller to form a chocolate sheet, and apparatus and methods for producing the confectionery composition described.

13 Claims, 5 Drawing Sheets

(56) References Cited

FOREIGN PATENT DOCUMENTS

| EP | 1437045 A1 | 7/2004 |
|----|------------|--------|
| GB | 26767 | 0/1910 |
| GB | 131495 | 9/1918 |
| GB | 1345115 | 1/1974 |
| JP | 59066842 A | 4/1984 |
| SU | 982994 | 7/1981 |
| WO | 8804897 A1 | 7/1988 |
| WO | 03005832 A1 | 1/2003 |

OTHER PUBLICATIONS

British Search Report; British Application No. GB0908781.8; Date of Search Oct. 8, 2009; Claims searched 9-17.

British Search Report; British Application No. GB0908781.8; Date of Search Sep. 4, 2009; Claims searched 1-8 and 18-29.

Ateco Decorating Comb & Icing Smoother; available at http://www.amazon.com/Ateco-Decorating-Comb-Icing-Smoother/dp/B0000VOOXI/ref=cm_cr_pr_product_top; first reviewed on Apr. 10, 2009.

New Zealand Examination Report dated Aug. 1, 2012, re: Patent Application No. 595688; citing: Ateco Decorating Comb & Icing Smoother.

International Search Report PCT/GB2010/000999; Dated Aug. 5, 2010.

Russian Office Action of Apr. 29, 2014; RU Application 2011152115/13/(078231); filed Dec. 20, 2011; 5 pages.

\* cited by examiner

CONVOLUTED CHOCOLATE PRODUCT WITH REGIONS OF WEAKNESS AND PROCESS FOR PREPARATION THEREOF

CROSS REFERENCE TO RELATED APPLICATIONS

This is a US National Stage of Application No. PCT/GB2010/000999, filed on May 18, 2010, which claims the priority of GB Application No. 0908781.8 filed May 21, 2009.

TECHNICAL FIELD

The present invention relates to confectionery products. In particular, it relates to confectionery products comprising a convoluted chocolate sheet, to method of making such products, and to scraper blades for use in removing chocolate from a roller.

BACKGROUND

Convoluted chocolate sheets are known in the art, and typically consist of a thin sheet of chocolate which is irregularly folded onto itself to create a bulk chocolate layer having a multitude of relatively large, irregular, air pockets therein. For example, the Applicant has produced a product under the trade name CADBURY FLAKE® since 1920, consisting of a bar of convoluted chocolate sheet. The combination of the relatively thin sheet of chocolate with the relatively large air pockets, and the irregular nature of the folds, gives the product a crumbly, flaky texture which offers a significantly different mouthfeel when compared to biting into a solid block of chocolate. In addition, the air pockets ensure that the product has a relatively low weight, and hence a low calorific value, when compared to other chocolate bars having a similar bulk.

One method for producing a bar of convoluted chocolate sheet is described in "Chocolate, Cocoa, and Confectionery: Science and Technology", Third Edition, by Bernard W. Minifie (published in 1989 by Chapman & Hall), on pages 189-190. A kneaded chocolate paste is applied to the first in a series of refining rollers to form a film or sheet of chocolate, which is transferred along the series of rollers. The separation between the rollers controls the thickness of the sheet. At the final roller, a scraper blade removes the sheet from the roller in a plasticised state, causing it to wrinkle and fold into an approximately cylindrical bar. The bar of convoluted chocolate sheet is then transferred by conveyor to a cooling apparatus.

The cross-sectional area of the bar is controlled by the amount of chocolate sheet incorporated into each bar, which in turn is determined by the interval between removing successive bars from the scraper blade (assuming a constant rotation of the rollers). The length of the bars is determined by the length of the rollers and scraper blade; the entire length of the roller/scraper blade (corresponding to the width of the chocolate film on the final roller) may be formed into a single bar of the same length. Alternatively, a series of small sharp protrusions at intervals along the scraper blade may be used to separate the chocolate film into sections as it is removed from the roller, concurrently producing a number of bars of convoluted chocolate sheet, with the lengths thereof determined by the distances between protrusions.

A similar method is disclosed in published International (PCT) Patent Application WO 03/005832 A1.

However, existing bars of convoluted chocolate sheet can be difficult to eat as a result of the crumbly texture. It is difficult to divide the bar into portions, such as for example by taking bites therefrom, or by breaking by hand to share with others, without the bar fragmenting. Such fragmentation can lead to the consumer dropping pieces of chocolate onto the ground or their clothing, and may deter consumers from eating such bars in a public place.

The present invention has been conceived with the above problems in mind.

SUMMARY

According to a first aspect of the present invention, there is provided a confectionery composition comprising a convoluted chocolate sheet having fold lines arranged generally along a first direction and having at least one region of weakness, each region of weakness extending along the full width of the chocolate sheet substantially in a single plane transverse to the first direction.

It will be understood that the folds in a convoluted chocolate sheet are not typically regular and hence are not strictly parallel, but do have the same general orientation in the first direction. Where further shaping of the convoluted chocolate sheet has occurred following formation, so that the fold lines are substantially twisted or non-linear, it will be understood that a first direction may nevertheless be determined for any local grouping of fold lines, and that any region of weakness in the vicinity of that local grouping will fulfil the above condition.

In some embodiments, each region of weakness is a linear region of weakness. For example, the linear region of weakness may be a single unbroken line of weakness.

It is believed that a region of weakness extending throughout the chocolate sheet allows the convoluted chocolate sheet to be easily divided into separate portions by breaking at the region of weakness, with minimal fragmentation. The portions may be sized to be placed into the mouth cavity (typically referred to as 'bite size' portions), enabling the product to be eaten with a minimum of mess. Alternatively or additionally, the portions may enable the product to be shared by several consumers.

In some embodiments, the convoluted chocolate sheet is in the form of a bar, and the first direction corresponds to the longitudinal axis of the bar. For example, the bar may have a length of 10-20 cm, or of 12-15 cm. In this manner, the regions of weakness may enable successive pieces to be broken off the end of the bar. Breaking of successive pieces from the end of a bar is known with bars of solid chocolate, such as those sold under the trade name CADBURY DAIRY MILK®, which are in the form of 'chunks' of chocolate separated by thinner joining regions. In such cases, the thinner cross-section of the joining region enables the bar to be more easily broken; however, there is no region of weakness extending through the bar. The same technique cannot be used for convoluted chocolate sheet, due to the fragile and crumbly nature. Although it might be possible to make a bar of convoluted chocolate sheet having a thinner cross-section at some points, this would have no effect on the chocolate sheet within the interior of the bar, which would still crumble as before. Thus, the mere provision of a thinner region in a bar of convoluted chocolate sheet would not enable successive pieces to be broken cleanly from the end of the bar.

In some embodiments, the convoluted chocolate sheet has more than one region of weakness. In some further embodiments, the planes containing the regions of weakness are substantially equally spaced along the first direction. In this manner, the convoluted chocolate sheet may be divided into several equivalently-sized portions. In a typically-sized confectionery composition, the convoluted chocolate sheet may have 3 or 4 regions of weakness, dividing the convoluted chocolate sheet into 4 or 5 (respectively) portions.

In some embodiments, the chocolate sheet has a general thickness of at least 1 mm. In some further embodiments, the general thickness is at least 1.5 mm, or at least 2 mm. It will also be understood that these dimensions refer to the thickness of the individual folds of sheet making up the convoluted chocolate sheet, rather than to the bulk thickness of the entire layer of convoluted chocolate sheet.

In some embodiments, the regions of weakness comprise regions in which the chocolate sheet has a thickness of no more than 75% of the general thickness of the sheet. In some further embodiments, the regions of weakness comprise regions in which the chocolate sheet has a thickness of no more than 65% or 60% or 55% of the general thickness of the sheet. In some still further embodiments, the regions of weakness comprise regions in which the chocolate sheet has a thickness of no more than 50% of the general thickness of the sheet. It will be understood that the 'general' thickness of the chocolate sheet is the typical thickness in areas other than the regions of weakness.

It will be understood that the confectionery composition may consist solely of the convoluted chocolate sheet, or alternatively may comprise additional components. In some embodiments, the convoluted chocolate sheet may define a cavity therein, and the confectionery composition may further comprise a filling material located in the cavity. For example, the cavity may be formed by drilling a hole into the convoluted chocolate sheet, or by shaping the convoluted chocolate sheet around a form which is then removed. The filling material may be any suitable confectionery material, including for example chocolate, praline, cream, emulsion, caramel, toffee, syrup, nougat, marshmallow.

According to a second aspect of the invention, there is provided a scraper blade for removing chocolate from a roller to form a chocolate sheet, the scraper blade comprising means for creating a region of weakness in the chocolate sheet.

In some embodiments, the scraper blade comprises means for creating multiple regions of weakness in the chocolate sheet.

In some embodiments, the scraper blade comprises a blade edge, and the means for creating a region of weakness in the chocolate sheet comprises a slit in the blade edge. For example, the slit may limit the amount of chocolate removed from the roller by the scraper blade in the region of the slit, so that the region of weakness comprises a line of chocolate sheet having reduced thickness, when compared to the remainder of the chocolate sheet. Once the chocolate sheet is folded to form a convoluted chocolate sheet, each line of reduced thickness will form a region of weakness in the convoluted chocolate sheet.

The slit may have any suitable shape as will be readily apparent to the skilled addressee. In particular, the slit may be defined by edges that are straight, curved, or a mixture of the two. Each side of the slit may be formed from one or a plurality of edges. A slit may be formed having three edges which generally define three sides of a quadrilateral. As an alternative, a slit may be formed having four or more sides generally defining a slit which is approximately pentagonal, or a higher order polygon, in shape. In some embodiments, the slit is symmetrical about a line perpendicular to the blade edge. The sides of the slit may be parallel, giving the slit a uniform width, or may be non-parallel. In particular, the sides of the slit may converge or diverge towards the blade edge.

The slit may also be 'triangular' in shape, having 3 straight edges, with one of the points being the opening at the blade edge. The triangular slit may be in the form of an isosceles triangle with the narrowest point being the opening at the blade, and the two corners lying symmetrically either side of an axis perpendicular to the blade edge and passing through the opening. It is thought that this design helps to prevent the slit from being clogged with chocolate as it is removed from the roller. In another example, the slit is substantially rectangular with the long edges of the rectangle perpendicular to the blade edge, and thus giving a constant width. However, adjacent to the blade edge, a 45° 'chamfer' links the long edges of the rectangle to the blade edge, so that the widest part of the slit is located immediately adjacent to the blade edge.

In some embodiments, the width of the slit at the blade edge is no more than 1.5 mm and the depth of the slit is no more than 10 mm. In some further embodiments, the width of the slit at the blade edge is no more than 1 mm and the depth of the slit is no more than 6 mm.

In some embodiments, the scraper blade comprises a blade edge having at least one first slit having a first width at the blade edge and a first depth, and the means for creating a region of weakness in the chocolate sheet comprises a second slit having a second width at the blade edge and a second depth, at least one of the second width and the second depth being less than the corresponding one of the first width and first depth.

The dimensions of the first slits should be chosen so that they prevent chocolate from being removed from the roller across the full width of each slit. It is believed that, by providing regions in which chocolate sheet is not removed from the roller, the first slits divide the single chocolate layer on the roller into a number of distinct chocolate sheets, each of which can be used to make a series of products (such as bars). The second slits, being smaller in at least one of width and depth than the first slits, can be dimensioned such that they remove some chocolate, but less than the full thickness of the chocolate layer on the roller.

In some embodiments, the blade edge is divided into sections by the at least one first slit, and each section is provided with at least one second slit. Each convoluted chocolate sheet produced using the scraper blade will therefore have at least one region of weakness. In some embodiments, each section has 3 or 4 second slits.

In some further embodiments, each section is provided with the same number of second slits. In some still further embodiments, the length of each section, and arrangement of second slits in each section, are the same. Each convoluted chocolate sheet produced using the scraper blade will therefore have the same arrangement of regions of weakness.

In some embodiments, the second width is less than the first width and the second depth is less than the first depth.

In some embodiments, the first width is at least 3 mm and the first depth is at least 30 mm. In some further embodiments, the first width is at least 4.5 mm and the first depth is at least 40 mm.

In some embodiments, the second width is no more than 1.5 mm and the second depth is no more than 10 mm. In some further embodiments, the second width is no more than 1 mm and the second depth is no more than 6 mm. In some still further embodiments, the second width is 0.75 mm and the second depth is 5 mm.

These dimensions have been found by the inventors to be particularly suitable for use in the formation of convoluted chocolate sheets.

According to a third aspect of the invention, there is provided an apparatus for producing a confectionery composition according to the first aspect, the apparatus comprising a roller, means for creating a layer of chocolate having a defined thickness on the roller, a scraper blade for removing chocolate from the roller to form a chocolate sheet, and means for creating a region of weakness in the chocolate sheet.

It will be understood that the means for creating a region of weakness in the chocolate sheet may be positioned to act on the layer of chocolate on the roller, such as for example to create a region of weakness in the layer of chocolate on the roller, so that removal of chocolate from the layer to form a chocolate sheet results in a chocolate sheet having a region of weakness therein. Alternatively or additionally, the means for creating a region of weakness in the chocolate sheet may be positioned to act on the chocolate sheet concurrently with, or after, the creation of the chocolate sheet through removal of chocolate from the roller.

In some embodiments, the means for creating a region of weakness in the chocolate sheet comprises an air nozzle positioned to direct a focussed jet of air at a region of the layer of chocolate on the roller. It will be understood that the jet of air ablates the chocolate as it passes through the jet, creating a region of thin (and hence weaker) chocolate. When the chocolate sheet is removed from the roller and formed into a convoluted chocolate sheet, this will produce the required region of weakness. Exemplary air nozzles may have a diameter of 0.2 or 0.3 mm.

There are a number of advantages associated with the use of a jet of air. Firstly, since the air nozzle does not contact the chocolate roll, it does not become clogged with chocolate and hence there is a reduced need to stop the apparatus for cleaning. Similarly, there is a reduced risk of contamination of the chocolate from the apparatus. Furthermore, it is relatively straightforward to change the intensity of the air jet, or even turn it off completely, during operation of the apparatus. Thus, for example, the jet of air could be 'pulsed' to create a region of weakness in which the weakness is intermittent, or simply to provide fine control over the particular properties. Similarly, the region of weakness could be confined to certain regions of the convoluted chocolate sheet within each confectionery composition, such as, for example, to ensure that the region of weakness is not visible at the exterior of the convoluted sheet.

In some embodiments, the means for creating a region of weakness in the chocolate sheet comprises a knife edge positioned for insertion into the layer of chocolate on the roller. It will be understood that, in order to create a region of weakness (rather than completely separating the chocolate layer into two), the knife edge should not penetrate through the layer of chocolate. Thus in some embodiments, the means for creating a region of weakness in the chocolate sheet comprises a block for placing on the upper surface of the layer of chocolate, the block having a knife edge on a lower surface thereof, such that placement of the block on the layer of chocolate causes the knife edge to penetrate partially into the layer of chocolate, with the block preventing the knife edge from inserting too far into the chocolate layer. Thus, as the layer of chocolate passes under the block, a region of weakness is created by the knife edge. The knife edge may be molded integrally with the block, and the block/knife edge may be made from any suitable material, such as metal or plastic.

In some embodiments, the scraper blade comprises the means for creating a region of weakness in the chocolate sheet.

In some embodiments, the scraper blade comprises a blade edge, and the means for creating a region of weakness in the chocolate sheet comprises a slit in the blade edge. For example, the slit may limit the amount of chocolate removed from the roller by the scraper blade in the region of the slit, so that the region of weakness comprises a line of chocolate sheet having reduced thickness, when compared to the remainder of the chocolate sheet. Once the chocolate sheet is folded to form a convoluted chocolate sheet, each line of reduced thickness will form a region of weakness in the convoluted chocolate sheet.

In some further embodiments, the dimensions of the slit are such that the resulting region of weakness is a region of chocolate sheet having a thickness of no more than 75% of the general thickness of the chocolate sheet. In some further embodiments, the dimensions of the slit are such that the resulting region of weakness is a region of chocolate sheet having a thickness of no more than 65%, 60%, or 55% of the general thickness of the chocolate sheet. In some still further embodiments, the dimensions of the slit are such that the resulting region of weakness is a region of chocolate sheet having a thickness of no more than 50% of the general thickness of the chocolate sheet.

In some further embodiments, the depth of the slits is less than the thickness of the layer of chocolate formed on the roller.

In some further embodiments, the width of the slit is no more than 1.5 mm and the depth of the slit is no more than 10 mm. In some further embodiments, the width of the slit is no more than 1 mm and the depth of the slit is no more than 6 mm.

In some embodiments, the scraper blade is arranged such that the blade edge is adjacent the roller.

In some embodiments, the means for creating a layer of chocolate having a defined thickness on the roller comprises means for creating a layer of chocolate at least 1 mm thick on the roller.

In some further embodiments, the means for creating a layer of chocolate having a defined thickness on the roller comprises means for creating a layer of chocolate at least 1.5 mm, or at least 2 mm thick.

In some embodiments, the apparatus further comprises means for cleaning the scraper blade. This is particularly useful where the scraper blade edge has a slit therein for creating a region of weakness in the resulting chocolate sheet, since the slit can become clogged with chocolate, rendering it inoperable. The means for cleaning the scraper blade may comprise a compressed air jet. Where the scraper blade edge has a slit therein, the compressed air jet may be directed at the slit.

In some embodiments, the scraper blade is a scraper blade according to the second aspect of the invention.

According to a fourth aspect of the invention, there is provided a method for preparing a confectionery composition according to the first aspect, comprising applying a layer of chocolate to a roller, removing chocolate from the roller to form a sheet of chocolate having at least one linear region of weakness therein, and repeatedly folding the sheet of chocolate substantially perpendicular to the linear region of weakness to form a convoluted chocolate sheet.

Introduction of the linear region of weakness into the sheet of chocolate before folding into a convoluted chocolate sheet allows the linear region of weakness to be created in every fold of the convoluted sheet. This is in contrast to methods which might involve manipulation of the convoluted chocolate sheet (i.e. after folding), and which cannot therefore affect folds located in the interior of the convoluted sheet. Thus, the convoluted chocolate sheet produced according to the present aspect can be broken cleanly at the linear region of weakness across the entire thickness of the sheet, avoiding the crumbling inevitably experienced with sheets obtained by the prior art methods.

In some embodiments, the linear region of weakness is a line of weakness.

It will be understood that the method may be operated as a continuous process. In particular, in some embodiments the leading region of the sheet of chocolate is folded whilst trailing regions of the chocolate are still on the roller. Similarly, the linear region(s) of weakness may or may not be present in some or all of the layer of chocolate still on the roller. In some embodiments, therefore, the leading region of the chocolate sheet has at least one linear region of weakness therein and is folded; some trailing regions which have been removed from the roller and incorporate the at least one linear region of weakness have not yet been folded; and still further trailing regions of the chocolate are still on the roller and may or may not have the at least one linear region of weakness. It is, however, important that the at least one linear region of weakness is present in the chocolate sheet before folding the sheet of chocolate.

In some embodiments, repeatedly folding the sheet of chocolate comprises reducing the speed of leading regions of the sheet of chocolate following removal from the roller. In some further embodiments, reducing the speed of leading regions of the sheet of chocolate comprises passing the sheet of chocolate over a surface. For example, the surface may be the surface of the scraper blade. In some alternative further embodiments, reducing the speed of leading regions of the sheet of chocolate comprises retaining the sheet of chocolate between the roller and a retaining barrier. For example, the retaining barrier may be formed by at least one bounding edge of a cavity into which the leading regions of the sheet of chocolate are fed. The continued speed of trailing regions of chocolate sheet (such as due to continued removal of the sheet of chocolate from the roller) therefore compresses the leading regions, causing wrinkling and folding thereof.

In some embodiments removing chocolate from the roller to form a sheet of chocolate having at least one line of weakness therein comprises removing chocolate from the roller by means of a scraping blade according to the second aspect of the invention.

In some embodiments, the method of the fourth aspect of the invention is carried out on apparatus according to the third aspect of the invention.

As used herein, the term 'chocolate' is intended to refer to a confectionery composition comprising both to chocolate compositions based on cocoa butter, as well as to chocolate-like compositions in which some or all of the cocoa butter is replaced by cocoa butter equivalent (CBE), cocoa butter substitute (CBS), cocoa butter replacer, a non-metabolisable fat, or a non-fat ingredient. Such compositions are well known in the art. Typically, the chocolate will be milk, plain or white chocolate. It will be understood that it is a requirement of the first and third aspects of the present invention that the chocolate be capable of production in a plastic form susceptible to folding. Such chocolate recipes are known in the art.

BRIEF DESCRIPTION OF THE FIGURES

Specific embodiments of the first, second, third and fourth aspects of the invention will now be described by way of example, with reference to the accompanying Figures, in which:

FIGS. 5b and 5c are schematic representations of alternative embodiments of the slits of the scraper blade of FIG. 5a;

DETAILED DESCRIPTION

Figure 1:
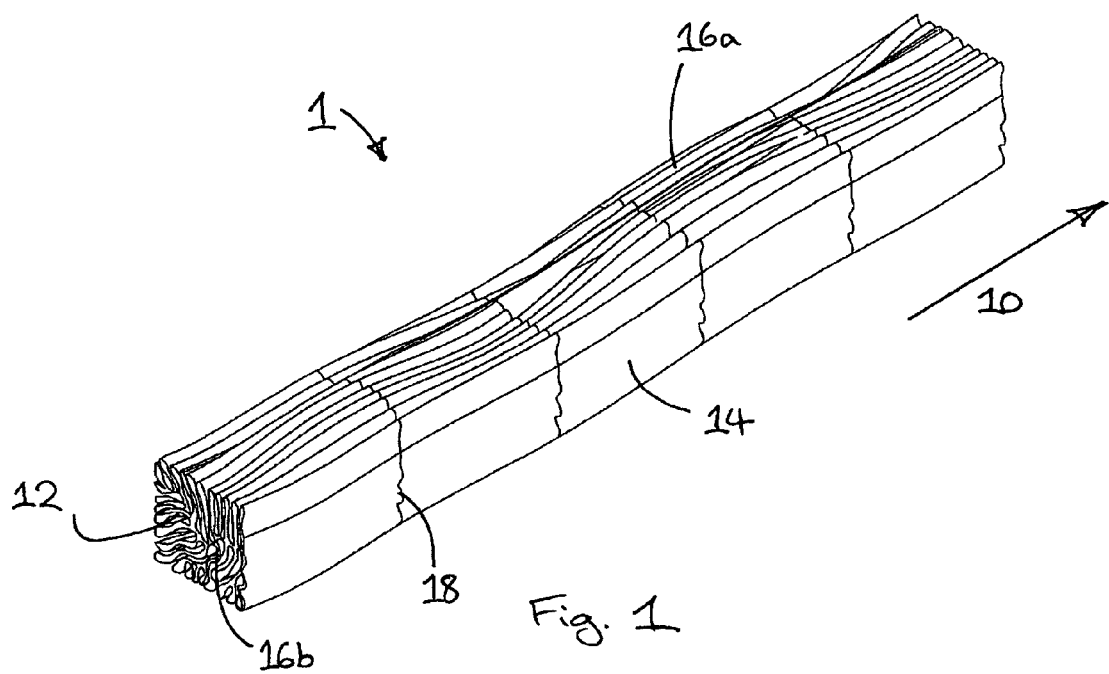
FIG. 1 is a perspective view of one embodiment of a chocolate composition according to the first aspect of the invention.
Figure 2:
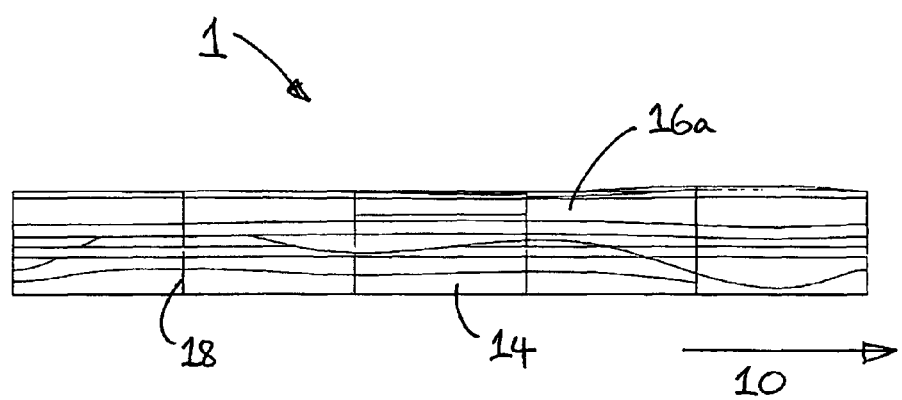
FIG. 2 is a plan view of the chocolate composition of FIG. 1.
Figure 3:
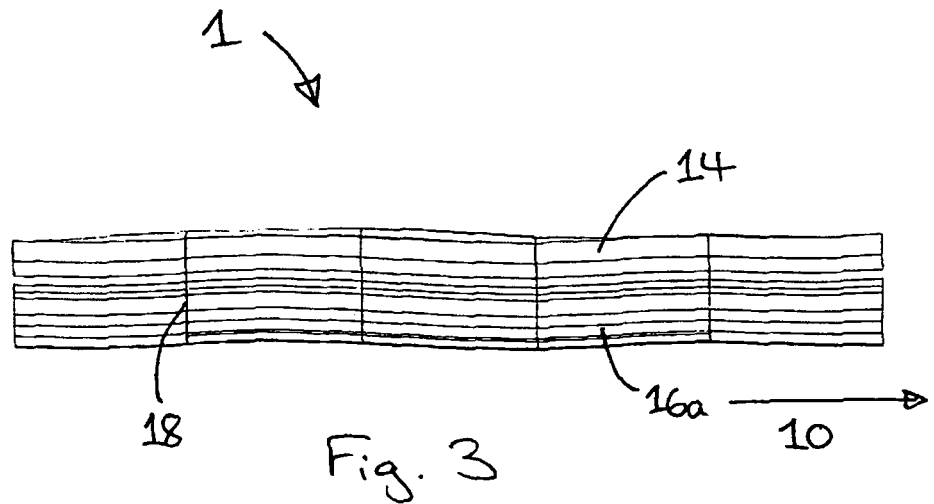
FIG. 3 is a side view of the chocolate composition of FIG. 1.

Referring to FIGS. 1 to 4, a chocolate bar 1 has a longitudinal axis 10, and an approximately rectangular cross-section, as can be seen from end face 12.

The bar is formed from a single sheet 14 of milk chocolate, which is folded repeatedly. Some of the folds 16a are exposed at the surface of the bar, whilst others 16b are located within the bars interior. The folds are irregular, in terms of the fold radius, distance between adjacent folds, and the fold lines. However, all folds 16a, 16b are oriented such that the fold lines lie generally along longitudinal axis 10.

Four lines of weakness 18 are spaced at regular intervals along the bar, dividing the bar into 5 portions of approximately equal length. Each line of weakness 18 lies approximately within a single plane transverse to the longitudinal axis 10.

Figure 4:
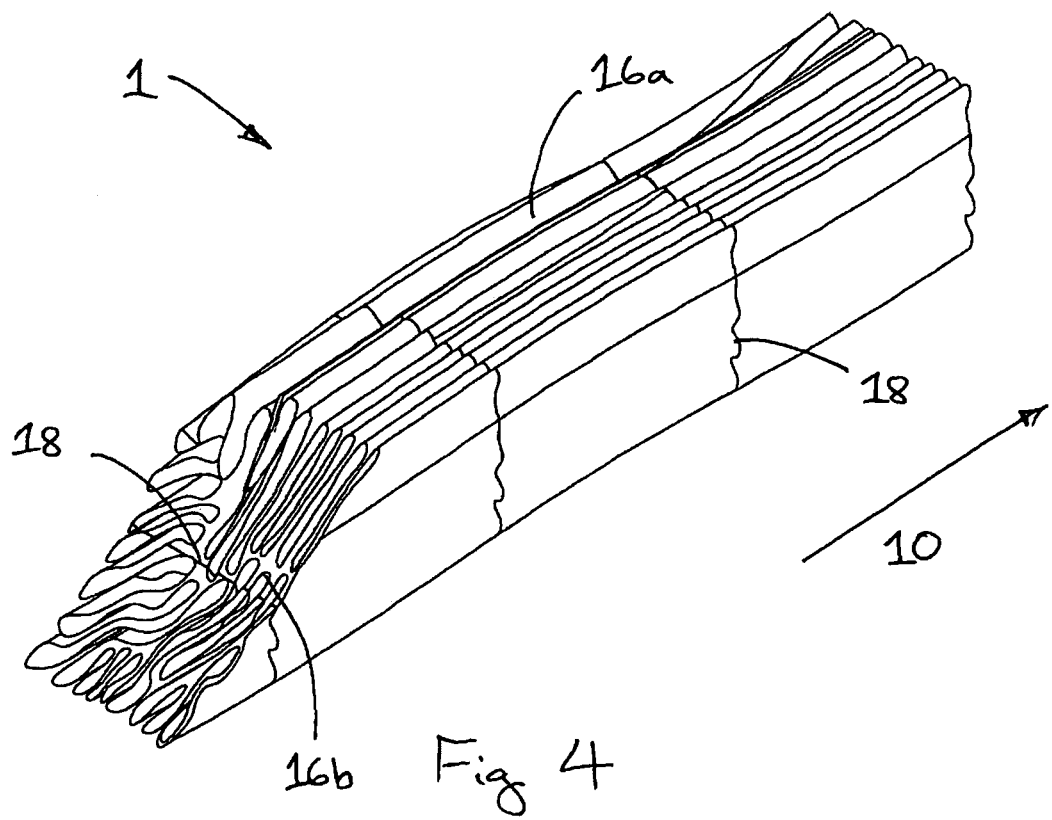
FIG. 4 is a perspective view of the chocolate composition of FIG. 1 having a transverse cross-section therethrough in a plane.

As can be seen in FIG. 4, the lines of weakness 18 extend throughout the interior of the bar 1.

Figure 5A:
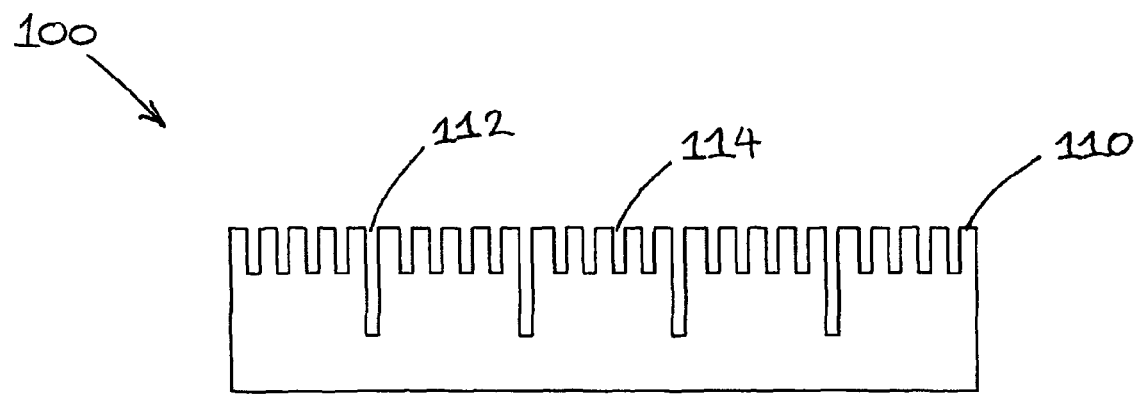
FIG. 5a is a schematic representation of one embodiment of a scraper blade according to the second aspect of the invention.

Referring to FIG. 5a (not shown to scale), a scraper blade 100 according to the second aspect of the invention has a straight blade edge 110. The length of the blade is 940 mm, and it has a width of 75 mm and a thickness of 1 mm.

The blade edge 110 is divided into five equal sections by four rectangular first slits 112. Each first slit is 42.5 mm deep and 5 mm wide. Each section of the blade edge is further divided into five equal sub-sections by four rectangular second slits 114. Each second slit is 5 mm deep and 0.75 mm wide.

Figures 5B, 5C:
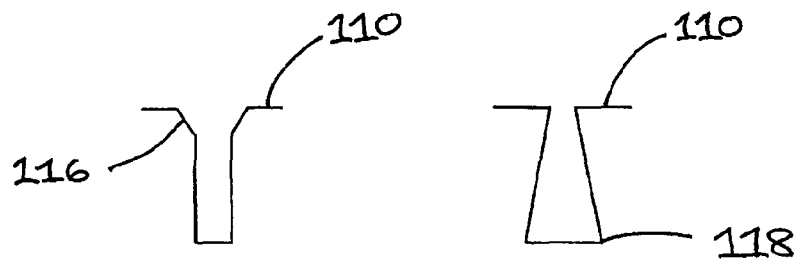

As shown in FIGS. 5b and 5c, the second slits may have other shapes. In particular, as shown in FIG. 5b, the slits may be substantially rectangular in shape, but have a 45° chamfer 116 linking each of the slit sides to the blade edge 110. Alternatively, as shown in FIG. 5c, the slits may be generally triangular in shape having 3 straight edges which generally follow the shape of an isosceles triangle, with the narrowest point being the opening at the blade edge 110, and the two corners 118 lying symmetrically either side of an axis perpendicular to the blade edge 110 and passing through the opening.

Figure 6:
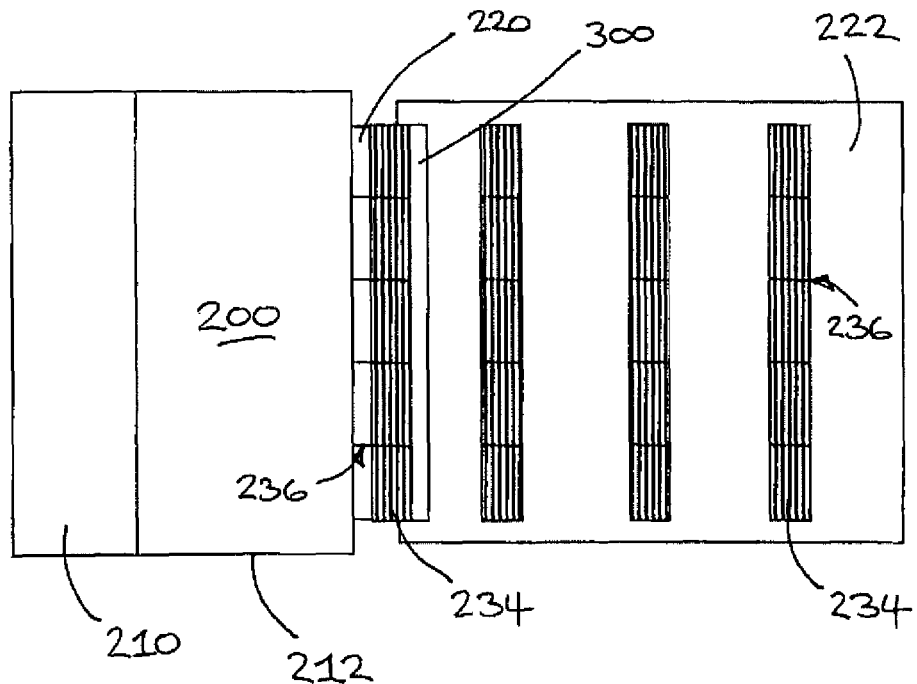
FIG. 6 is a plan view of one embodiment of an apparatus according to the third aspect, suitable for operating one embodiment of a method according to the fourth aspect of the invention.
Figure 7:
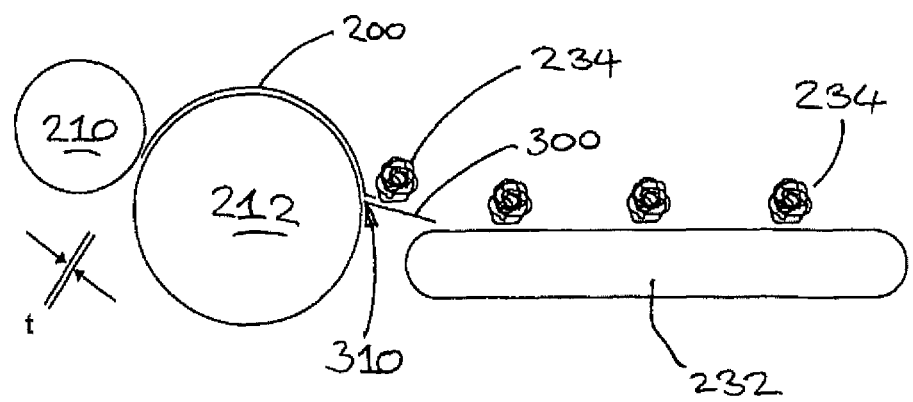
FIG. 7 is a side view of the apparatus of FIG. 6.

Referring to FIGS. 6 and 7, a layer of milk chocolate 200 is applied to a second roller 212 by means of a first roller 210, with the separation of the rollers defining the thickness t (not shown to scale) of the chocolate layer. A scraper blade 300 removes chocolate from the second roller 212 by means of a blade edge 310 to form a chocolate sheet 220. The blade edge 310 has a series of four slits (not shown) therein, each slit having a depth less than the thickness t of the chocolate layer 200, such that the chocolate sheet 220 is formed with four parallel lines of weakness 236 therein.

The blade 300 is angled downwards away from the roller at approximately 60° to the vertical, so that the chocolate sheet 220 removed by the blade moves over the surface of the blade 300. Friction between the chocolate sheet 220 and the surface of the blade 300 restricts the speed of movement down the blade surface.

Pressure from the advancing sheet being removed from the roller 212 causes the sheet 220 to fold and wrinkle, forming a bar of convoluted sheet 234. The folding occurs substantially perpendicularly to the direction of movement of the advancing sheet 220, and hence substantially perpendicularly to the lines of weakness 236. Thus, each line of weakness 236 lies substantially within a single plane in the resulting bar 234. The blade 300 periodically (e.g. every 10 s) moves away from the roller 212 to release the bar of convoluted sheet onto a conveyor 222. The bars of convoluted sheet are carried away for further processing, which may include tamping into a bar of defined width and height, and cooling to solidify the bar into its final shape. The blade 300 returns to the position shown to resume removal of a chocolate sheet 220 from the roller 212.

Figure 8:
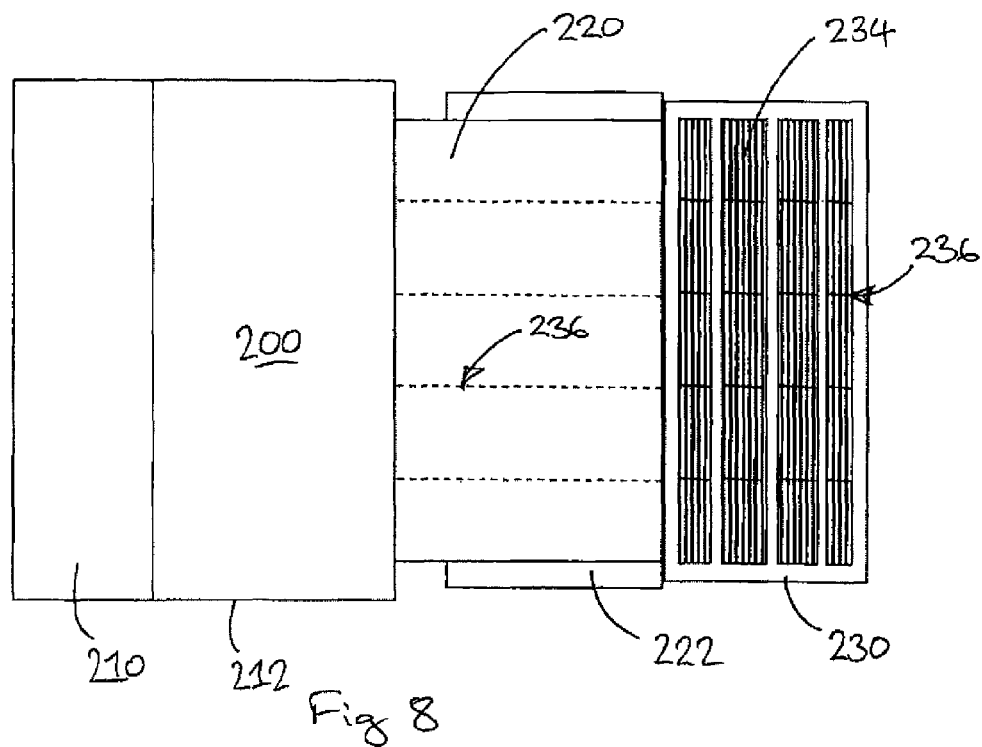
FIG. 8 is a plan view of an alternative embodiment of an apparatus according to the third aspect, suitable for operating an alternative embodiment of a method according to the fourth aspect of the invention.
Figure 9:
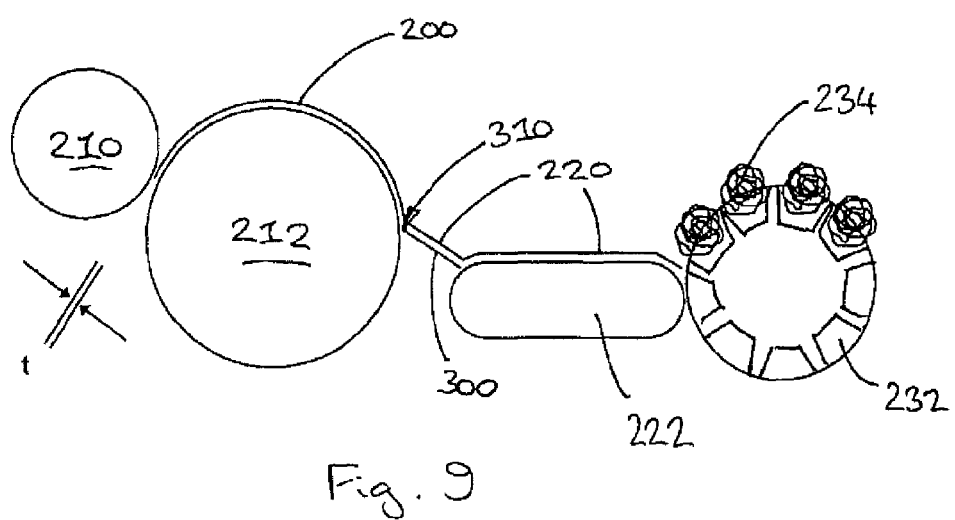
FIG. 9 is a side view of the apparatus of FIG. 8.

FIGS. 8 and 9 show an alternative process, in which the chocolate sheet 220 removed by the blade edge 310 is not retained on the blade surface, but passes over the blade 300 to a conveyor 222. This sheet is carried along the conveyor to a rotating cylindrical drum 230 with its axis lying below the level of, and perpendicular to the direction of travel of, the conveyor 222. The drum 230 has a circumferential series of approximately cuboid cavities 232 in the surface thereof, each cavity extending across the full width of the chocolate sheet 220 on the conveyor 222.

As the chocolate sheet 220 reaches the drum 230, it is introduced into a single cavity 232 in the drum surface. As the sheet enters the cavity and contacts the cavity edge, the pressure of the advancing chocolate sheet causes the sheet to fold and wrinkle, thereby forming a convoluted sheet 234, which is pressed into, and adopts the approximate shape of the cavity. The drum then advances, carrying the resulting bar of convoluted chocolate sheet within its cavity, and exposing an empty cavity to the remaining chocolate sheet on the conveyor. Once the formed bars of convoluted chocolate sheet reach the opposite side of the drum, they are deposited onto a conveyor and are carried to cooling tunnels (not shown) to fully harden.

Although the use of milk chocolate is described above, it will be apparent to the skilled man that other chocolate recipes may be used, provided that they can be removed from the roller in a sufficiently plastic form to undergo the folding required to form a convoluted sheet. Suitable recipes are known in the art.

Although the apparatus shown in FIGS. 6 to 9 are shown producing a single bar at a time, it will be apparent to the skilled man that they could equally be used to produce multiple bars at a time. For example, placement of multiple scraper blades in a line with gaps therebetween, or using a scraper blade as shown in FIG. 5 having one or more larger slits therein, would allow the apparatus to produce multiple parallel chocolate sheets, each of which could be folded to produce a bar of convoluted chocolate sheet at the same time.

The invention claimed is:

1. A confectionery composition comprising a convoluted chocolate sheet having fold lines arranged generally along a first direction and having at least one region of weakness, each region of weakness extending along the full width of the chocolate sheet substantially in a single plane transverse to the first direction, wherein the convoluted chocolate sheet defines a cavity therein, and the confectionery composition further comprises a filling material located in the cavity.

2. The confectionery composition as claimed in claim 1, wherein the region of weakness is a linear region of weakness.

3. The confectionery composition as claimed in claim 1, wherein the convoluted chocolate sheet is in the form of a bar and the first direction corresponds with the longitudinal axis of the bar.

4. The confectionery composition as claimed in claim 1, wherein the convoluted chocolate sheet has more than one region of weakness.

5. The confectionery composition as claimed in claim 4, wherein the planes containing the regions of weakness are substantially equally spaced along the first direction.

6. The confectionery composition as claimed in claim 1, wherein the convoluted chocolate sheet has a thickness of at least 1 mm.

7. The confectionery composition as claimed in claim 1, wherein the region of weakness has a thickness of no more than 75% of the thickness of the chocolate sheet.

8. A method for preparing a confectionery composition according to claim 1, comprising
   applying a layer of chocolate to a roller,
   removing chocolate from the roller to form a sheet of chocolate having at least one linear region of weakness therein, and
   repeatedly folding the sheet of chocolate substantially perpendicular to the linear region of weakness to form a convoluted chocolate sheet defining a cavity therein; and
   locating a filling material in the cavity.

9. The method as claimed in claim 8, wherein the linear region of weakness is a line of weakness.

10. The method as claimed in claim 8, wherein repeatedly folding the sheet of chocolate comprises reducing the speed of leading regions of the sheet of chocolate following removal from the roller.

11. The method as claimed in claim 10, wherein reducing the speed of leading regions of the sheet of chocolate comprises passing the sheet of chocolate over a surface.

12. The method as claimed in claim 11, wherein removing chocolate from the roller to form a sheet of chocolate comprises removing chocolate from the roller using a scraper blade, and the surface comprises a surface of the scraper blade.

13. The method as claimed in claim 10, wherein reducing the speed of leading regions of the sheet of chocolate comprises introducing leading regions of the sheet of chocolate into a cavity.

* * * * *